United States Patent Office 3,667,928
Patented June 6, 1972

3,667,928
INCREASED COMPONENT CONCENTRATION OF NUTRIENT SOLUTIONS OF TRACE METALS
Peter Stanley Backlund, Anaheim, Calif., assignor to Union Oil Company of California, Los Angeles, Calif.
No Drawing. Filed Nov. 12, 1969, Ser. No. 875,741
Int. Cl. C05b 7/00
U.S. Cl. 71—34
6 Claims

ABSTRACT OF THE DISCLOSURE

A solution suitable for application to plants and soil to correct a plurality of trace metal deficiencies is described which comprises an aqueous solution of the sulfate salts of two or more of iron, zinc and manganese together with mono-potassium or mono-ammonium hydrogen orthophosphate having an acidic pH value from about 1.5 to about 4, and wherein the components of the solution manifest a mutually increased solubility.

DESCRIPTION OF THE INVENTION

This invention relates to nutrient solutions and in particular relates to nutrient solutions containing two or more of ferrous sulfate, zinc sulfate and manganese sulfate suitable for correction of deficiencies of these metals in crops and soils.

The most commonly encountered trace metal deficiencies in crops or soils are iron, zinc or manganese deficiencies. Often deficiencies of two or more of these metals are encountered in a single soil or crop.

While the metals-containing solutions of this invention can be used to correct deficiencies of specific metals at any time, it has been found that the solutions are of particular value in late season application, i.e., 20 to about 45 days prior to harvesting. It has been found that the application of these solutions, particularly those in which phosphorus is present in major proportions, results in greatly enhanced late season growth, particularly when potassium or nitrogen are also present. Accordingly, this invention is directed to such metals-containing compositions and a method for their preparation.

I have found that ammonium or potassium dihydrogen orthophosphate, or mixtures thereof, in admixture with the sulfates of iron, zinc or manganese in aqueous solution, form eutectic compositions having greatly enhanced solubilities of the solids. This enhanced solubility greatly increases the amount of the phosphate, e.g., approximately doubles the solubility of the phosphate in the aqueous solution for any given salting out temperature. This enhanced solubility of a major nutrient in a metals-containing nutrient solution is significant in that it permits the application of the major nutrient, i.e., phosphorous in substantial quantities to the plant simultaneously with the application of the metals to correct metals deficiencies.

Figure 1:
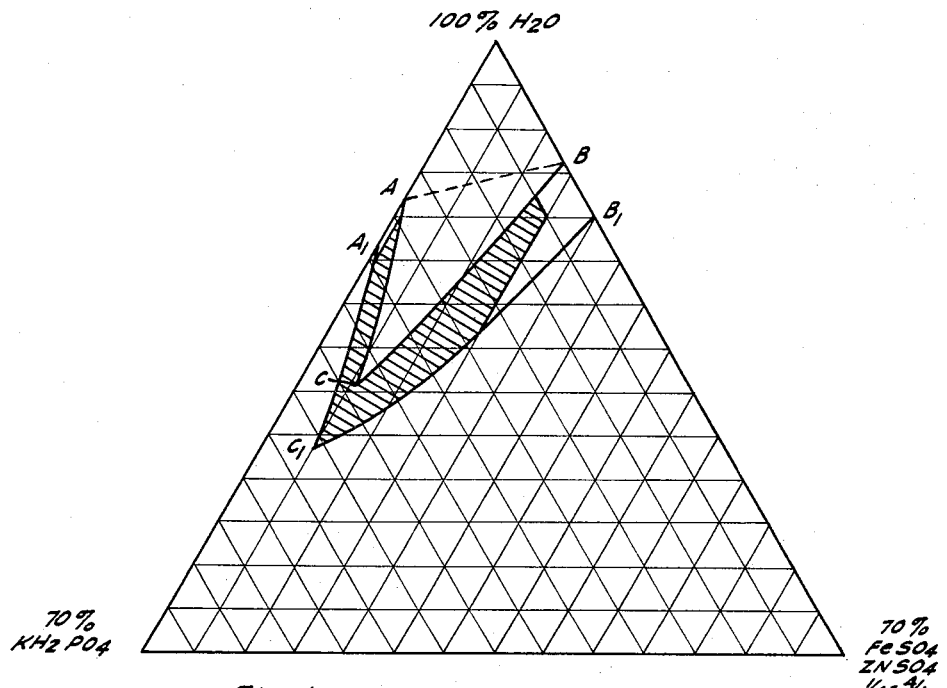
Figure 2:
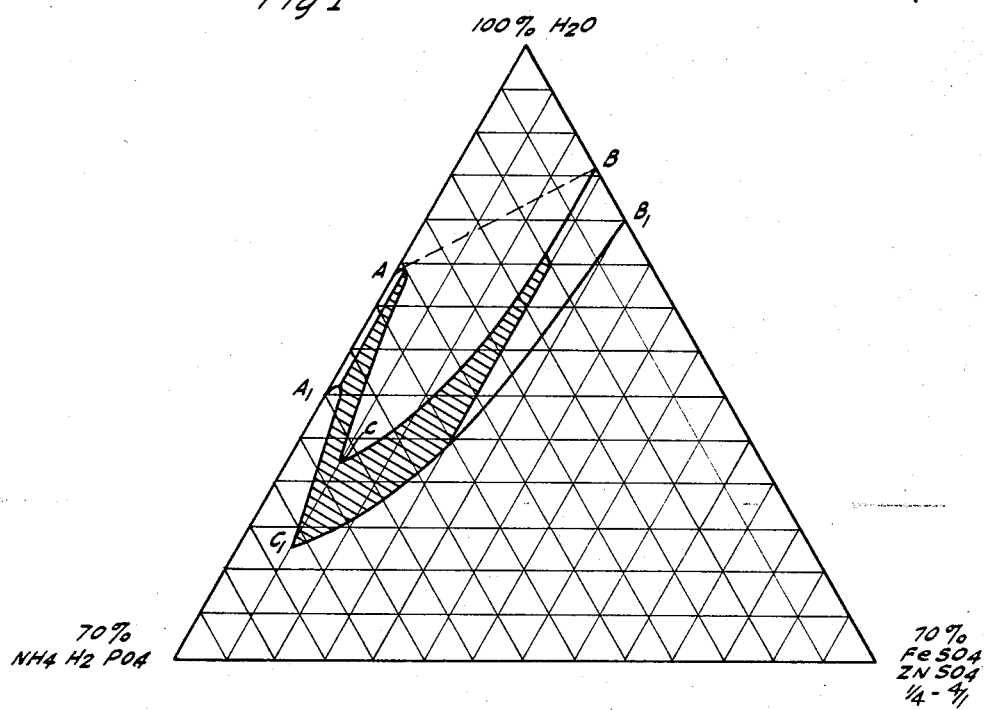

The solutions of this invention will be described by reference to the figures of which:

FIG. 1 is a ternary diagram of the system of mono-potassium orthophosphate, water and an equal weight mixture of zinc and ferrous sulfates; and FIG. 2 is a ternary diagram for the system of mono-ammonium hydrogen orthophosphate, water and an equal weight mixture of zinc ferrous sulfates.

Referring to FIG. 1, it can be seen that the mixture of zinc and ferrous sulfates and mono-potassium hydrogen orthophosphate form eutectic compositions having greatly enhanced solubilities. The system depicted in FIG. 1 represents the system at a pH value of 2; however, this system is substantially identical to the systems having pH values in the range from about 1.5 to about 4 which are encompassed within this invention. The metal solutes comprise an equal weight mixture of zinc and ferrous sulfates, however, the diagram is substantially identical for the system whenever a mixture of zinc and ferrous sulfates having a weight ratio from about 1/4 to 4/1 zinc to ferrous sulfate is used. As illustrated, the maximum solubility of mono-potassium hydrogen orthophosphate in water at 0° centigrade is illustrated by point A as comprising about 18.5 weight percent of the solute. At 20° C. there is a slight increase in solubility to 23 weight percent of mono-potassium hydrogen orthophosphate solute shown at point $A_1$. Similarly, the maximum solubility of the mixture of zinc and ferrous sulfates in an aqueous solution at 0° C. is approximately 14 weight percent solute, point B, while at 20° C. is approximately 20 weight percent solute, point $B_1$. The broken line A–B connecting the points A and B of the 0° isotherm represents the normally expected solubilities of these salts upon simple admixture of the solutions A and B. Thus, it would be expected, absent any synergistic effect on solubility exhibited by the combination, that the solubilities of the mixtures of the salts would fall along the straight line A–B. Contrary to this expectation, I have found that the combination of salts exhibits a synergistic effect on the phosphate salt solubility and mixtures of solutions A and B will dissolve further quantities of solute so that the isotherm is substantially depressed, particularly for solutions containing about 5 weight percent of the zinc and ferrous sulfates where, at point C, it can be seen that the total solute content of the solution, including the zinc and ferrous sulfates along with the mono-potassium hydrogen orthophosphate, is about 40 weight percent, considerably in excess of the solubilities of either of the individual components in the water. A similar effect can be illustrated at the 20° C. isotherm as represented by points $A_1$, $B_1$ and $C_1$ wherein a solution containing up to 47 weight percent of said total solute is possible without exceeding the 20° C. salting out temperature.

Solutions falling within the scope of this invention therefore comprise those solutions having salting out temperatures no greater than 0° C. and comprising an aqueous solution of a mixture of zinc and ferrous sulfates and mono-potassium hydrogen orthophosphate with a pH value from about 1.5 to about 4 and the composition included within the area defined by line A–B, B–C and C–A of FIG. 1. Other solutions embraced within the scope of this invention comprise those solutions having from 1 to about 15 weight percent of a mixture of zinc and ferrous sulfates, from 5 to about 41 weight percent mono-potassium hydrogen orthophosphate and from 54 to about 82 weight percent water, in an amount sufficient to provide a salting out temperature of the solution from 0° to about 20° C. These compositions are encompassed within the shaded area appearing on FIG. 1. Of the solutions within the scope of the invention, the most preferred are those containing from about 2 to 10 weight percent of the mixed zinc and ferrous sulfates with a consequentially high content of mono-potassium orthophosphate.

Referring now to FIG. 2, the ternary system for the mono-ammonium orthophosphate, mixed zinc and ferrous sulfates and water can be seen. This system, as that previously described, exhibits a eutectic point in solubility, i.e., the solutes exhibit synergistic solubilities. As with the previously described system, the solubilities shown in FIG. 2 are applicable to solutions containing mixtures of zinc and ferrous sulfates at weight ratios from about 1/4 to 4/1 zinc to ferrous sulfate. The mono-ammonium orthophosphate solute has a maximum solubility in an aqueous solution at a pH from about 1.5 to 4 of about 26 weight percent at 0° C. and, at 20° C., approximately 40 weight percent. These points are shown as A and $A_1$ of FIG. 2. The mixture of zinc and ferrous sulfates have solubilities in water of 14 and 20 weight percent at 0° and 20° C., respectively. As with the previously described system, the solutions encompassed by my invention comprise those solutions contained within the area defined by the lines A–B, B–$B_1$, $B_2$–$C_1$, $C_1$–$A_1$ and $A_1$–A. It is these solutions which exhibit an unexpectedly low salting out temperature for any given solute concentration which is lower than the expected salting out temperature if the solutes simply combined additively.

Particularly preferred solutions are those having from 1 to 15 weight percent of a mixture of zinc and ferrous sulfates, from 10 to 51 weight percent mono-ammonium orthophosphate and from 44 to about 76 weight percent water. These solutions are shown in the shaded area of FIG. 2. Of these solutions and of the solutions within the area A–B–C–A, the most preferred compositions are those having from about 2 to 10 weight percent of a mixture of zinc and ferrous sulfates with consequently high contents of mono-ammonium orthophosphate.

Although not separately shown, similar ternary systems occur when the ammonium or potassium dihydrogen orthophosphate solute is replaced with a mixture of both these solutes. Such systems, while being quaternary systems, can be depicted on a tertiary diagram at any constant ratio of the ammonium to the potassium salt and have solubilities intermediate the two extremes shown in FIGS. 1 and 2.

In a similar fashion, aqueous solutions comprising a mixture of manganese sulfate with zinc sulfate, ferrous sulfate or a mixture thereof can be prepared. The manganese sulfate exhibits a similar eutectic composition with the potassium and ammonium phosphate salts so that enhanced solubility of the phosphate is achieved with solutions containing from 1 to about 10 weight percent of a mixture of manganese sulfate with zinc or ferrous sulfates at weight ratios of 1/4 to 4/1 of the manganese to the zinc or ferrous sulfate.

Mixtures of all three metal solutes with ammonium or potassium orthophosphate can be prepared, when needed, with the compositions containing from 2 to about 6 parts of each of the metal salts per each 10 parts of the mixture.

The aforementioned solutions are employed with an acidic pH, i.e., a pH from 1.5 to about 4.0, preferably from 2 to 3. The dihydrogen orthophosphate solutes have a slightly acid pH when dissolved in an aqueous solution. Their pH, however, is lowered by the addition of a minor amount of a mineral acid such as sulfuric acid, phosphoric acid, nitric acid, or a hydrohalic acid, e.g., hydrochloric, hydrobromic, hydroiodic or hydrofluoric. The amount of the mineral acid which is added to the solutions to lower the pH to the desired value can be from about 0.05 to about 5.0 weight percent, preferably from about 0.1 to about 2 weight percent.

The preferred use of the aforementioned solutions comprises the foliar application of the solutions to crops late in the growing season, e.g., at a period within about 20 to 45 days prior to the harvesting. The solutions can be applied in undiluted concentration or, if desired, can be admixed with from 0.1 to about 10 gallons of water per gallon of the aforementioned solution. The solutions are applied at a dosage sufficient to provide from about 0.01 to about 0.5 pound metals per acre, preferably from about 0.1 to about 0.2 pound metals per acre. In alternative applications, the solutions can be applied at the aforementioned dosages directly to the soil and can be applied at any time prior to or during the growing season of the particular crop. In such uses the solutions can be applied to correct known or suspected deficiencies of iron in the soil before a metals deficiency appears in the crop or can be applied to the soil whenever the metals deficiency becomes apparent by an abnormal appearance of the crop.

The aforementioned solutions are compatible with most nutrient solutions and can be blended therewith in any desired proportion. Thus the aforementioned solutions can be blended with from about 1 to about 25 gallons per gallon of the solution of various nutrient solutions such as aqueous solutions of ammonium nitrate, urea, mixtures thereof, urea-formaldehyde solutions, ammonium phosphate solutions, etc. The aqueous solutions can also be mixed with various suspensions of supersaturated solutions of the aforementioned nutrient solutes or suspensions of various fertilizer solids such as triple superphosphate, superphosphate, acidulated and pulverized phosphate rock, etc.

It has been observed that the iron-containing solutions can develop a slight cloudiness upon standing. This is caused by the slow formation of ferric orthophosphate which is insoluble in the aqueous solutions. The ferric orthophosphate is formed by a slow oxidation of the ferrous ions to ferric ions by dissolved oxygen. This tendency does not provide any major problem in the use of the solutions because only a minor amount of precipitation occurs and the precipitate which is formed is flocculant and only imparts cloudiness to the solutions.

I have found that even this slight precipitation can be prevented by incorporating, in the solution, a soluble reducing agent that has an oxidation potential more negative than iron in the solution. The presence of from 0.1 to about 1.0, preferably from about 0.2 to 0.5 weight percent of such a reducing agent maintains the clarity of the solutions for prolonged storage periods.

Examples of suitable reducing agents are the low molecular weight ($C_1$–$C_5$) alkanols, e.g., formaldehyde, acetaldehyde, propionaldehyde, butyraldehyde, valeraldehyde, etc. Reducing sugars, e.g., those capable of reducing Fehling's solution, can also be used. Examples of these are: monosaccharides such as glucose, mannose, galactose, fructose or sorbose; disaccharides such as melibose, maltose, revertose, celloboise, lactose or gentioboise; or trisaccharides such as rhamninose. Another group of suitable reducing agents are the various polyhydroxybenzenes such as hydroquinone, pyrogallol, 1,3,5 - trihydroxybenzene, 1,2,4,5-tetrahydroxybenzene, hexahydroxybenzene, etc.

The following will illustrate various compositions encompassed within the invention:

TABLE.—CONCENTRATION, WEIGHT PERCENT

| Solution | Reducing agent | $FeSO_4$ | $ZnSO_4$ | $MnSO_4$ | $KH_2PO_4$ | $NH_4H_2PO_4$ | $H_2O$ | $NH_4NO_3$ | 8-24-0 | $(NH_4)_2SO_4$ | Urea |
|---|---|---|---|---|---|---|---|---|---|---|---|
| 1 | | 5 | 5 | | 30 | | 60 | | | | |
| 2 | | 5 | 5 | 3 | 15 | | 72 | | | | |
| 3 | 0.3 mannose | 2 | 6 | | 27 | | 74.7 | | | | |
| 4 | | | 3 | 5 | 35 | | 57 | | | | |
| 5 | 0.5 glucose | 6 | 4 | 3 | 9 | | 77.5 | | | | |
| 6 | | 10 | 5 | 2 | 12 | | 61 | 10 | | | |
| 7 | 0.5 formaldehyde | 3 | | 8 | 10 | | 63.5 | | 15 | | |
| 8 | 0.3 pyrogallol | 2 | 2 | 2 | 25 | | 48.7 | | | 20 | |
| 9 | 0.3 glucose | 1 | 2 | 1 | 25 | 8 | 52.7 | | | | 10 |
| 10 | 0.1 pyrogallol | 3 | 1 | 3 | 10 | 30 | 52.9 | | | | |

TABLE—Continued

| Solution | Reducing agent | FeSO₄ | ZnSO₄ | MnSO₄ | KH₂PO₄ | NH₄H₂PO₄ | H₂O | NH₄NO₃ | 8-24-0 | (NH₄)₂SO₄ | Urea |
|---|---|---|---|---|---|---|---|---|---|---|---|
| 11 | | | 5 | 3 | | 25 | 67 | | | | |
| 12 | | | 2 | 6 | | 20 | 72 | | | | |
| 13 | | | 8 | 2 | | 40 | 50 | | | | |
| 14 | 0.3 glucose | 3 | 3 | | | 49 | 44.7 | | | | |
| 15 | | | 5 | 1 | | 50 | 39 | 5 | | | |
| 16 | 0.2 propionaldehyde | 3 | 3 | 4 | | 35 | 46.8 | | 8 | | |
| 17 | 0.5 valeroaldehyde | 6 | 6 | 4 | | 25 | 58.5 | | | | |
| 18 | 0.1 pyrogallol | 3 | 3 | | | 45 | 38.9 | | | 10 | |
| 19 | 0.3, 1,3,5-trihydroxybenzene | 2 | 2 | 6 | 15 | 25 | 49.7 | | | | |
| 20 | 0.3 maltose | 2 | 2 | 1 | | 40 | 39.7 | | | | 15 |

I have found that manganese sulfate can be added to compositions that are at saturation with the zinc and ferrous sulfates without exceeding their solubilities. This can be illustrated by a composition containing 5 grams ferrous sulfate heptahydrate and 5 grams zinc sulfate heptahydrate, 32.0 grams mono-potassium hydrogen orthophosphate and 4.7 grams nitric acid in 50.3 grams water. This solution has a pH value of about 2.0 and a crystallization temperature of about −2 to 0° C. To this solution can be added 1 to about 10 grams manganese sulfate monohydrate without raising the crystallization temperature.

In another illustration, a solution is prepared by mixing 12 grams potassium hydroxide, 30 grams of 85 weight percent orthophosphoric acid, 8.8 grams zinc sulfate heptahydrate, 2.5 grams ferrous sulfate heptahydrate, 0.2 gram pyrogallol and 46.6 grams water. The solution has a crystallization temperature of about 0° C. To this solution can be added from 1 to about 10 grams manganese sulfate monohydrate without raising the crystallization temperature of the solution.

Similarly, manganese sulfate can be dissolved in solutions saturated with zinc or ferrous sulfate without raising their crystallization temperature. To illustrate, solutions containing either 5 grams ferrous sulfate heptahydrate or 5 grams zinc sulfate heptahydrate with 32 grams mono-potassium orthophosphate and 4.7 grams nitric acid in 55.3 grams water have pH values of about 2.0 and crystallization temperatures of about −3 to 0° C. These solutions will dissolve from 1 to about 10 grams manganese sulfate monohydrate without any significant increase in their crystallization temperatures.

The aforementioned illustrative compositions are not intended to unduly limit the invention, but rather it is intended that all obvious equivalents to such compositions which are described herein or obvious equivalents of solutions described herein are within the scope of the invention.

I claim:

1. An aqueous fertilizer solution comprising water, at least 1 weight percent of the micronutrient metal solutes ferrous and zinc sulfates having a ratio from 4/1 to 1/4 parts by weight of the zinc to ferrous sulfate, and a phosphorus solute selected from the class consisting of mono-potassium hydrogen orthophosphates and mono-ammonium hydrogen orthophosphate, and a sufficient quantity of mineral acid to impart to said solution a pH of between about 1.5 and 4; the concentration of said combined solutes in said solution being (1) greater than the additive concentrations of an aqueous solution saturated at 0° C. with said phosphorus solute, combined with an aqueous solution saturated at 0° C. with said metal solutes and (2) less than the salting out concentration at a temperature of 20° C.

2. A solution defined in claim 1 wherein said mineral acid is nitric, sulfuric or phosphoric acid.

3. The aqueous fertilizer solution of claim 1 wherein said phosphorus solute is mono-potassium hydrogen orthophosphate.

4. The aqueous fertilizer solution of claim 1 wherein said phosphorus solute is mono-ammonium hydrogen orthophosphate.

5. The aqueous fertilizer solution of claim 1 wherein said phosphorus solute is mono-potassium hydrogen orthophosphate and said combined solutes are present at a concentration greater than the saturated concentration of said solutes at 0° C. and less than the saturated concentration of said solutes at 20° C.

6. The aqueous fertilizer solution of claim 1 wherein said phosphorus solute is mono-ammonium hydrogen orthophosphate and said combined solutes are present at a concentration greater than the saturated concentration of said solutes at 0° C. and less than the saturated concentration of said solutes at 20° C.

References Cited

UNITED STATES PATENTS 2,270,518   1/1942   Ellis et al. _____ 71—64 C X
2,950,183   8/1960   Nikitin et al. _____ 71—1 X

OTHER REFERENCES

Liquid Fertilizer Manual, 1967, Chapter 5, p. 2, and Chapter 17, p. 1, published by National Fertilizer Solutions Association, Peoria, Ill.

REUBEN FRIEDMAN, Primary Examiner

B. H. LEVENSON, Assistant Examiner

U.S. Cl. X.R.

23—107; 71—1, 63, 64 C